Dec. 14, 1965   R. STOKLOSINSKI   3,222,879
RECOVERY OF KRYPTON AND XENON FROM AIR SEPARATION PLANTS
Filed Feb. 25, 1963
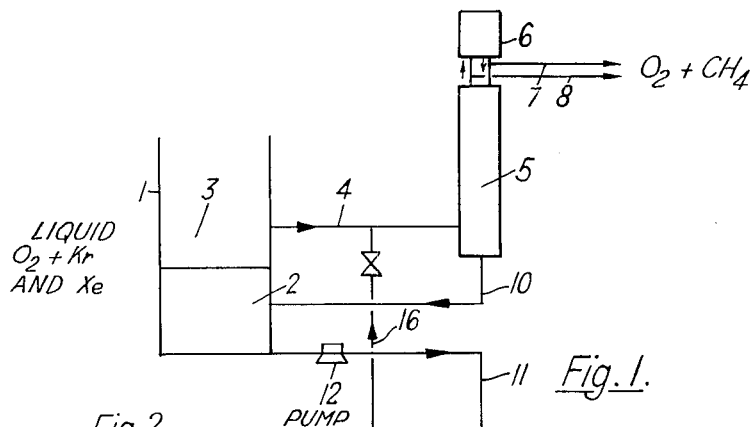
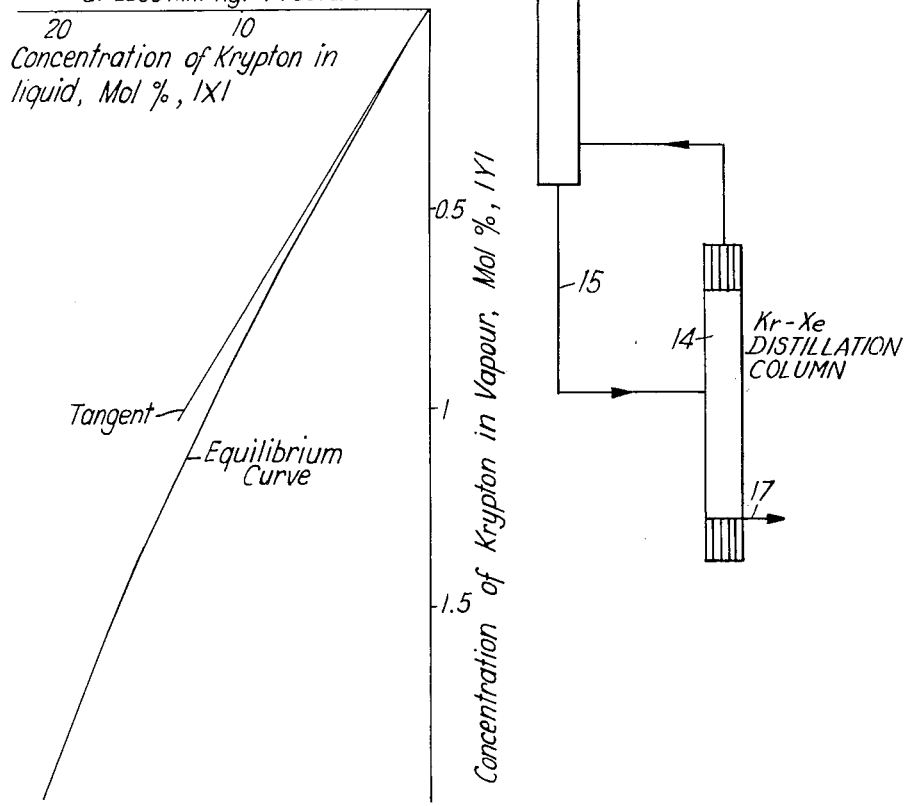
Inventor
Roman Stoklosinski
By Doarll H Doll
Attorneys

United States Patent Office 3,222,879
Patented Dec. 14, 1965

3,222,879
RECOVERY OF KRYPTON AND XENON
FROM AIR SEPARATION PLANTS
Roman Stoklosinski, 59 Winchester Road,
London, England
Filed Feb. 25, 1963, Ser. No. 260,551
Claims priority, application Great Britain, Feb. 27, 1962, 7,600/62
2 Claims. (Cl. 62—22)

This invention relates to a method of recovering krypton and xenon from liquid oxygen obtained in an air separation plant.

Krypton and xenon are, with the exception of radon, the highest-boiling normal constituent gases of air. In an air separation plant liquid krypton and xenon therefore collect in the boiling liquid oxygen in the sump of the main distillation column. Eventually equilibrium is established between the concentration of krypton and xenon in the sump and in the vapor immediately above, which vapor, in one kind of plant is withdrawn from the column to provide the oxygen output of the plant.

The concentration of low-boiling hydrocarbon and other impurities in the liquid oxygen in the sump can be maintained at a low value by continuous withdrawal from the sump of a stream of liquid oxygen which is passed through absorbers that remove these impurities and is then returned to the sump. This procedure is however, ineffective to eliminate methane from the crude liquid oxygen. Methane, being both volatile and soluble in liquid oxygen, therefore contaminates both the liquid oxygen and the supernatant vapor present in the sump.

According to the present invention there is provided a method of recovering a mixture of krypton and xenon from the methane-contaminated sump product of the main distillation column of an air separation plant, which method comprises passing the sump vapor upwards through a further distillation column provided with a liquid reflux, obtained by condensation of vapor at the top of that column, which reflux extracts krypton and xenon, but substantially no methane, from the ascending vapor, returning the extract to the sump of the main distillation column to provide a sump liquid enriched in krypton and xenon and of relatively low methane concentration; and withdrawing and rectifying the sump liquid so enriched.

The presence of methane in the liquid oxygen impedes the separation from the liquid oxygen of those elements of which the recovery is desired, namely krypton and xenon. Recovery of these elements can, on the other hand, be simply effected when they form part of an essentially three-component mixture of oxygen, krypton and xenon as is obtained by the method according to the invention.

The rectification of the krypton- and xenon-enriched sump liquid may conveniently be accomplished by fractionation under increased pressure in a two column rectifying system; krypton may be separated from xenon, if desired, in a further stage.

According as to whether a liquid or gaseous oxygen output from the air separation plant is desired all or part, respectively, of the vapor ascending through the further distillation column may be condensed at the top of that column. If a gaseous oxygen output is required only that amount of oxygen required to furnish the reflux is condensed: if a liquid, the whole of the ascending vapor is condensed, an amount of condensate sufficient to provide the necessary reflux being returned down the column while the remainder forms the plant output. Thus, the method according to the invention may be employed in conjunction with air separation plant which normally supplies a liquid and/or gaseous product stream without any fundamental change inn the overall function of the plant.

In both cases the methane remains essentially uncondensed, and escapes from the column in the oxygen product. Krypton and xenon are, however, extracted from the ascending vapor by the reflux, and are returned to the sump of the main distillation column. The liquid in the sump is therefore progressively depleted in methane content and enriched in krypton and xenon, thus tending to approach a three-component constitution.

In order that this invention may be more clearly understood it will be described with reference to the attached drawings, in which:

FIG. 1 is a diagrammatic flow sheet of an apparatus operating in accordance with the invention.

FIG. 2 is a graph of the concentration of krypton in the vapor phase plotted against the concentration of the krypton in the liquid phase.

The apparatus shown in FIGURE 1 includes a sump 1 containing liquid oxygen in the lower portion 2 of the main distillation column of an air separation plant. Vapor in equilibrium with the liquid 2 and consisting essentially of oxygen, methane, krypton and xenon is withdrawn from the space 3 immediately above the liquid by a conduit 4 and introduced into the base of a further distillation column 5. This column can be of conventional plate and bubble cap type and is designed to operate with reflux to condense the krypton and xenon constituents of the vapor and return them to the bottom of the column while allowing the methane to pass up the column uncondensed. The column 5 is provided at its upper part with a reflux condenser 6 which may be designed to condense all or a part of the vapor ascending through the column 5 according as to whether a liquid or gaseous oxygen produce is required, at this point. In the former case, liquid oxygen product is withdrawn through a conduit 7: in the latter case, uncondensed gaseous oxygen is withdrawn through a conduit 8.

The liquid sump product of column 5, containing krypton and xenon condensed out of the vapor ascending in that column by the reflux, is returned to the sump 1 of the main column by a conduit 10, the liquid 2 being thereby progressively enriched in krypton and xenon and impoverished in methane.

The krypton-and-xenon enriched liquid is withdrawn from the sump 1 by a conduit 11 which incorporates a pump 12 to deliver the liquid under slightly increased pressures to a rectifying system. The rectifying system includes two columns 13 and 14. The liquid from the sump 1 is introduced at the top of the first column 13, the liquid krypton/xenon concentrate from the bottom of this column is passed to an intermediate feed point of the second column 14 by way of a conduit 15. Vapor from the top of the second column 14 is returned to the bottom of the first column 13, and uncondensed vapor from the top of the first column 13 is recycled directly to the bottom of the column 5 by way of a conduit 16. The product liquid mixture of krypton and xenon is obtained in a product line 17 from the bottom of the column 14.

The vapor phase in the sump 1 of the main distillation column, which operates at a pressure of, say 1128 mm. Hg, is in equilibrium with the liquid phase 2 in respect both of its krypton/xenon and methane contents. Now, the proportion of the total methane content (of both phases) present in the vapor phase is much greater than the corresponding proportion of krypton/xenon, and withdrawal of vapor from the sump 1 therefore itself effects krypton/xenon enrichment of the sump liquid in relation to methane.

The withdrawn vapor is subsequently passed up the column in which it is scrubbed by a portion of its own condensate methane, being still volatile at the temperature required for this condensation, remaining essentially uncondensed. The establishment of equilibrium between the descending condensate and the ascending vapor involves the passage into the liquid phase of a proportion of vapor-phase krypton/xenon greater than the proportion of vapor phase methane so passing, since at the operating temperature of the column krypton/xenon still has a greater tendency to pass into the liquid phase than does methane.

The liquid eventually returned to the sump of the main column has therefore twice been enriched in krypton/xenon at the expense of methane, the sump liquid itself being progressively so enriched—as explained above—by virtue of the fact that the feed to the further column is drawn from the vapor phase in the sump of the main column.

The krypton-and-xenon enriched liquid from the sump of the main column is delivered to the top of the column 13 by the pump 12 which provides for an operating pressure of, say 2230 mm. of Hg for that column; the increased pressure is necessary because the solubility of krypton in liquid oxygen at the lower pressure is undesirably low.

Impurities, such as acetylene and low-boiling hydrocarbons, can be kept at low concentration by means of hydrocarbon absorbers.

The operation of the plant shown in FIGURE 1 is more fully described hereinbelow.

In this distillation column 5 some gas is condensed and refluxed at the top. This reflux contains oxygen and methane and as it travels down the column methane passes into the gases travelling up the column and krypton in the gases passes into the liquid. Thus the gases at the top of the column are enriched in methane and depleted in krypton and the liquid at the bottom of the column is enriched in krypton and depleted in methane. Some of the methane is then continually removed from the gases through the line 7 or 8. It is assumed that the krypton concentration in the oxygen product will be reduced to 0.3 v.p.m. and that the krypton concentration in the liquid oxygen in the sump of the main column will be 1000 v.p.m. during normal operation.

Krypton concentrate in liquid oxygen from the sump of the main column enters this column at the top as feed. Also at the top emerges a vapor stream containing 1000 v.p.m. of krypton (by assumption) and the same mass flow of oxygen and methane since it is supposed that these two components neither concentrate in this section nor are removed with the krypton-xenon product. Liquid stream leaving the column at the bottom contains krypton with some xenon, and the vapor entering the column there contains a virtually pure krypton. (For the purpose of these calculations it is assumed that the content of oxygen in the last two streams is less than 1 v.p.m.)

The primary concentrate will normally contain some impurities kept at a safe level with the help of hydrocarbon absorbers. However to make the calculations simpler the presence of these impurities is disregarded. The concentration of krypton by assumption is 1000 v.p.m. Now, the conentration of xenon in air is 0.086 v.p.m., and it is assumed that no xenon leaves the plant in the oxygen product, that it is completely recovered.

For small concentrations of methane in oxygen the equilibrium constant will be taken as $K=0.575$, however, with increasing concentration of krypton going down the column the temperature of the solutions will rise.

This will make the K value to increase until, at the temperature in the region of the boiling point of methane, the value of K will become one.

The normal b.p. of methane is $-161.49°$ C. This temperature corresponds to about 60% of krypton and 40% of oxygen, disregarding the increase in the total pressure.

The maximum concentration of methane reached appears to be about 62 v.p.m., which is far below the inflammability limit. This involves an assumption that if one substitutes krypton for nitrogen the inflammability region will not expand.

This distillation column 14 receives a feed consisting of krypton and a very small concentration of xenon.

Theoretically krypton and xenon could be separated in this column. However it is assumed that a single product consisting of krypton and xenon is withdrawn from the bottom of the column as liquid for the following reasons: (a) amounts of xenon are too small to be handled separately; (b) it is thought that liquid krypton will act as a medium in which the impurities collecting at the bottom of the column will be removed.

This column will be provided with a condenser and a reboiler.

The vapors from the top of the column will have virtually no xenon which will concentrate at the bottom.

There are no equilibrium data in the literature on the system krypton-xenon for the assumed conditions. It is not known to what extent the two components are miscible in each other in the liquid phase, but it is hoped that, as in the case of krypton, there is not too high a pressure which will ensure that a completely miscible solution of about 10% of xenon in liquid krypton can be obtained.

The impurities other than methane normally found in the liquid oxygen in the sump of the air distillation column are shown in the Table No. 1.

Out of this only carbon monoxide has b.p. below that of oxygen, and will be supposed not to concentrate in the system.

All the other impurities should pass through the column 13 and should concentrate in the sump of column 14 during normal operation.

*Table No. 1*

| Substance: | B.P., ° C. |
|---|---|
| Nitrous oxide, $N_2O$ | $-88.47$ |
| Ozone, $O_3$ | $-111.9$ |
| Carbon mon., CO | $-191.52$ |
| Acetylene, $C_2H_2$ | $-84.03$ |
| Methane, $CH_4$ | $-161.49$ |
| Ethane, $C_2H_6$ | $-88.63$ |

While I have described and illustrated a specific embodiment of my invention it will be clear that variations of the details specifically illustrated and described may be resorted to without departing from the true spirit and scope of the invention as defined in the appended claims.

The abbreviation v.p.m. is the standard method of indicating volume per million.

I claim:

1. A method of recovering a mixture of krypton and xenon from the methane-contaminated sump vapour product of an air distillation column, said product also containing oxygen, said method comprising the following steps: passing said sump vapour product upwardly through a further distillation column provided with a liquid reflux, in countercurrent with said liquid reflux, to thereby preferentially extract from said vapour product krypton and xenon, condensing said vapour product at the top of said further distillation column, returning part of said vapour product to said liquid reflux, and removing the oxygen content from said condensate, returning the reflux containing krypton and xenon to said sump to provide a sump liquid enriched in krypton and xenon, withdrawing said enriched sump liquid and passing it at an increased pressure into the top of a first rectifying column, permitting said enriched sump liquid to flow down said first rectifying column and thereby enriching the concentration of krypton and xenon in said liquid, removing the enriched liquid from the bottom of said first rectification column, and introducing said enriched liquid at an intermediate point into a second rectifying column, removing vapour from the top of said second rectifying column and returning said vapour to the bottom of said first rectifying column, recycling uncondensed vapour from the top of said first rectifying column to the bottom of said further distillation column, and removing the product mixture of krypton and xenon from the bottom of said second rectifying column.

2. In a method of producing oxygen by distillation of liquid air in a main distillation column having sump liquid and vapour supernatant on said liquid, said sump liquid and vapour respectively containing oxygen, methane, krypton and xenon, said method comprising the following steps: withdrawing said vapour and introducing it into the bottom of a further distillation column, obtaining at the top of said further distillation column a gaseous mixture consisting essentially of oxygen and substantially all of the methane present in said vapour, selectively condensing said gaseous mixture and obtaining a condensate thereof while allowing methane to escape condensation, passing said condensate down said further distillation column and withdrawing from the bottom of said column a liquid containing substantially all of the krypton and xenon from said vapour, returning said liquid from the base of said further column to said sump whereby there is obtained a sump liquid enriched in krypton and xenon, withdrawing enriched sump liquid and passing same at an increased pressure into the top of a first rectifying column whereby it flows down said column and concentrates krypton and xenon in said liquid, removing a liquid krypton and xenon concentrate from the bottom of said first rectifying column and introducing same at an intermediate point into a second rectifying column, removing vapour from the top of said second rectifying column and returning said vapour to the bottom of said first rectifying column, recycling uncondensed vapour from the top of said first rectifying column to the bottom of said distillation column, and removing a product mixture of krypton and xenon from the bottom of said second rectifying column.

References Cited by the Examiner
UNITED STATES PATENTS

| | | | |
|---|---|---|---|
| 1,963,809 | 6/1934 | Schuftan | 62—22 |
| 2,060,940 | 11/1936 | Kahle. | |
| 2,423,274 | 7/1947 | Van Nuys | 62—22 |
| 2,433,536 | 12/1947 | Van Nuys | 62—29 X |
| 2,546,778 | 3/1951 | Haringhuizen | 62—22 X |
| 2,793,511 | 5/1957 | Bonnaud | 62—22 |
| 2,962,868 | 12/1960 | Dennis | 62—22 |

NORMAN YUDKOFF, *Primary Examiner*